May 4, 1965

J. M. ROGERS 3,181,398

PIPE JOINT REFACING APPARATUS

Filed Oct. 29, 1962

John M. Rogers
INVENTOR.

BY Arnold and Roylance

ATTORNEYS

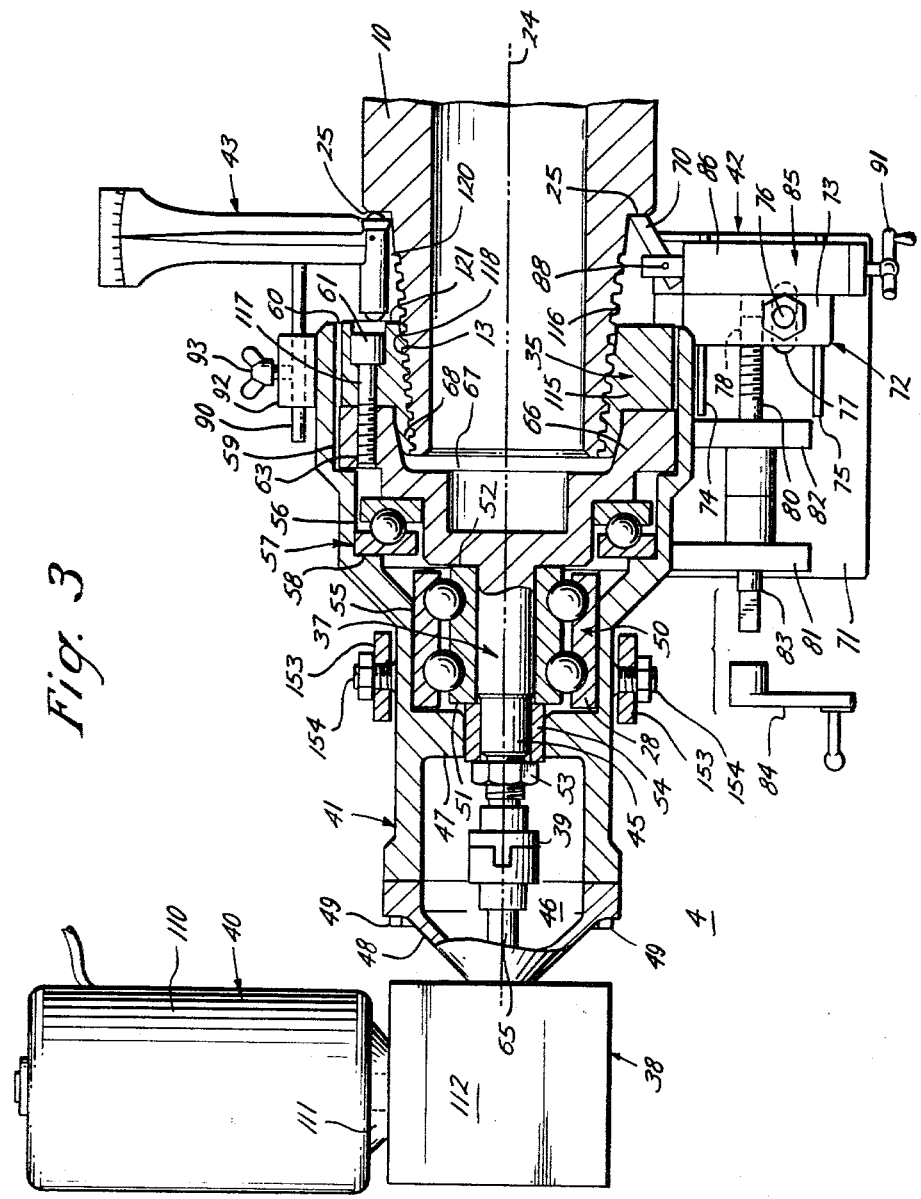

May 4, 1965 J. M. ROGERS 3,181,398
PIPE JOINT REFACING APPARATUS
Filed Oct. 29, 1962 3 Sheets-Sheet 3

John M. Rogers
INVENTOR.
BY Arnold and Roylance
ATTORNEYS

3,181,398
PIPE JOINT REFACING APPARATUS
John M. Rogers, 505 Park, Luling, Tex.
Filed Oct. 29, 1962, Ser. No. 233,625
6 Claims. (Cl. 82—4)

The present invention relates to apparatus for inspecting and reconditioning used pipe joints. More particularly, the present invention is directed to improved apparatus for determining the amount of pipe joint face to remove and performing the refacing operation.

An example of a pipe joint that needs frequent inspection and reconditioning is a tool joint used for connecting drill pipe together. The present invention is described in connection with such tool joints, bearing in mind it has equal application to other types of pipe joints.

The term tool joint is a well-known descriptive name for the couplings at either end of a drill pipe. Drill pipes are removed and added numerous times during the drilling operation and subjected to fluids containing abrasive materials, to significantly wear the screw threads and tool joint faces. Used tool joints must be inspected frequently to prevent leakage at the tool joints and to eliminate uneven tool joint faces that can make it difficult to disengage the tool joints.

In the past it has been the practice to individually inspect each tool joint at the rig site with a gauging tool to detect the thread wear and irregularities in the tool joint face that cannot be located by visual inspection. The used drill pipe that had to be refaced was shipped to a machine shop where a lathe type apparatus was set up to rework the tool joint face and, usually at the same time to rethread the tool joint. Considerable time was involved in getting the used pipe to the shop and, in many cases, rethreading of the drill pipe was not necessary even though the tool joint face had to be reworked. The machine in the shop that performed the refacing and rethreading operation was large and expensive, discouraging portable operation at the rig site.

In the refacing of a tool joint it is important that the new tool joint face be cut in relation to the axis of the tool joint, as determined by the screw thread. The accurate alignment of the cutting tool is accomplished in the shop machinery by aligned chucks and, usually, the threads of the tool joint are reworked, to assure proper relationship with the tool joint face. The need remains for a refacing device that is portable and inexpensive enough for a tool pusher to have a set up at the rig site to inspect a tool joint and perform the refacing operation.

It is therefore an object of the present invention to provide an apparatus that inspects and refaces pipe joints and is small enough for easy operation at the rig site.

A further object of the present invention is to provide apparatus that checks the tool joint face condition, taking into complete allowance the thread wear of the tool joint, and gauges the amount of tool joint face to remove.

A further object of the present invention is to provide apparatus that can be easily set up and quickly operated to inspect the condition of a tool joint face and without reinserting another device or moving the drill pipe to a machine shop, perform the tool joint refacing in precise relationship with the tool joint screw thread.

A still further object of the present invention is to provide a tool joint refacing device for use at the rig site and having provisions for precisely reworking the tool joint face irrespective of either deformities in the tool joint or irregularities in the attached pipe section that may cause movement of the tool joint on the rack.

Other objects and advantages of the present invention will become apparent from a reading of the following description and by referring to the attached drawings.

In brief, one of the embodiments of the present invention comprises means for engaging a pipe joint having a screw thread. The engaging means has a member with a screw thread arranged to mate in locking engagement with the screw thread of the pipe joint. The engaging means has a face spaced from the pipe joint face when the member screw thread is in locking engagement with the pipe joint screw thread, to define a space for gauging the amount of pipe joint face to remove. A support means mounts the member for rotational movement to engage with the pipe joint, and means is provided to rotate the member for locking engagement of the member screw thread with the pipe joint screw thread to rotatably drive the pipe joint. Cutting means is provided, carried by support means, and movable for refacing the tool joint as the pipe joint is rotated by the drive means. The support means may be suspended above the ground to adapt the refacing tool for use with drill pipe positioned on a pipe rack. The suspension apparatus allows the refacing device to follow the movement of a crooked or deformed pipe. A gauge may be mounted on the support means and disposed in the space between the face of the engaging means and the tool joint face to automatically indicate the amount of tool joint face that can be removed.

For a detailed description of the present invention reference is made to the drawings, wherein.

Figure 2A:
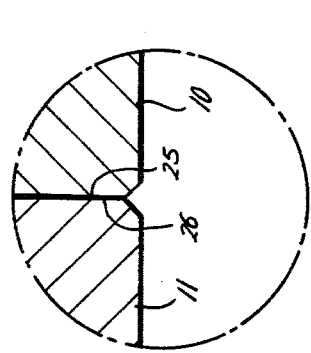
FIG. 2 is a longitudinal sectional view through a typical tool joint coupling, illustrating the mode of connection between tool joints as an aid to understanding the present invention.
Figure 2:
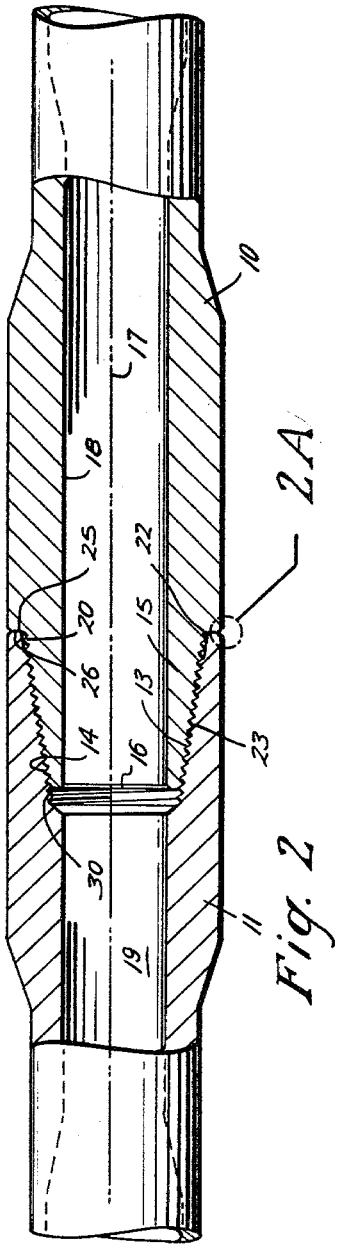
Figure 4:
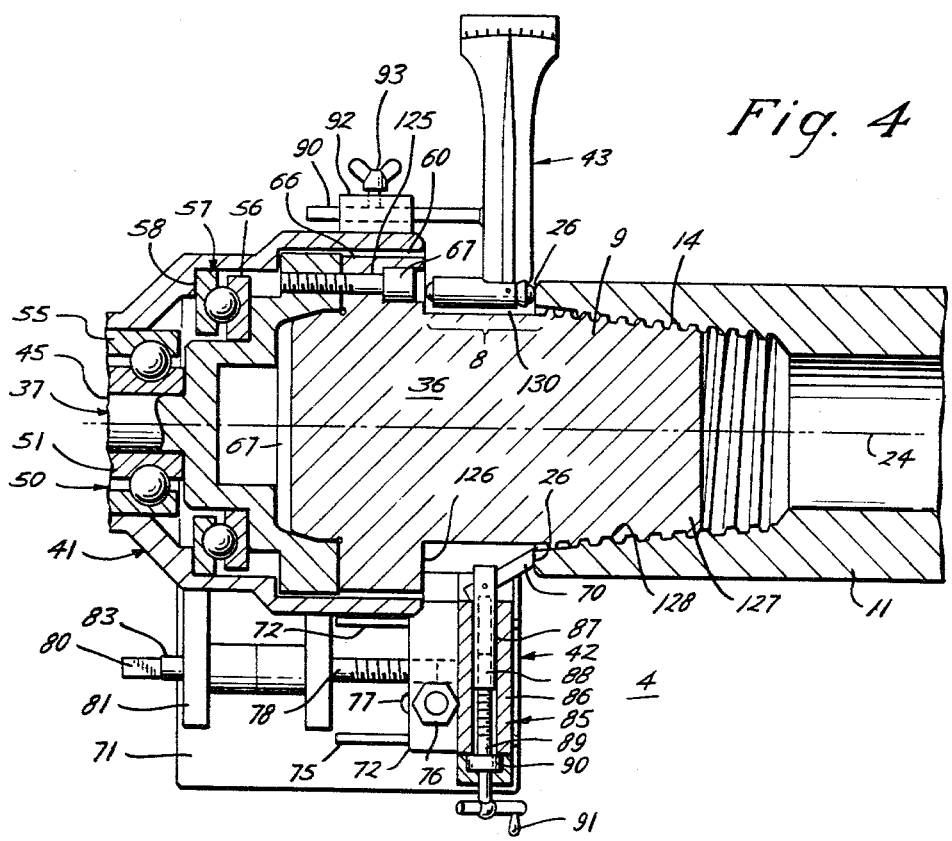
Figure 5:
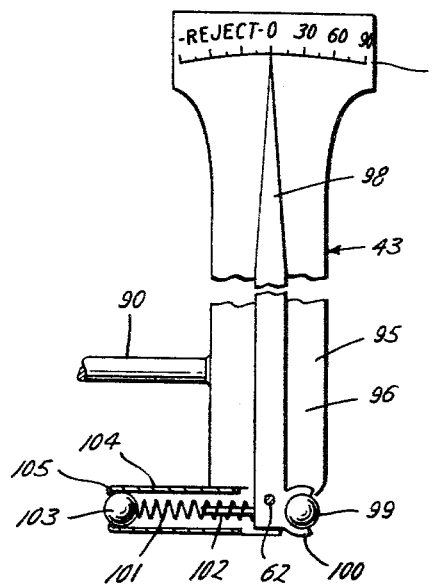

FIG. 2-A is an enlargement of the portion of FIG. 2 circled and identified by the reference mark 2-A, showing the abutting faces of the tool joints that are properly machined;

FIG. 3 is a plan view in partial section of one embodiment of a tool joint refacing device in accordance with the present invention, illustrating the refacing of a pin type tool joint;

FIG. 4 is a plan view in section with some of the apparatus identical to that shown in FIG. 3 removed for clarity, and illustrating one embodiment of the present invention for refacing a box type tool joint; and FIG. 5 is a plan view in partial section showing one form of gauge according to the present invention, the type used in the apparatus of FIGS. 3 and 4, that indicates the amount of tool joint face to remove.

Figure 1:
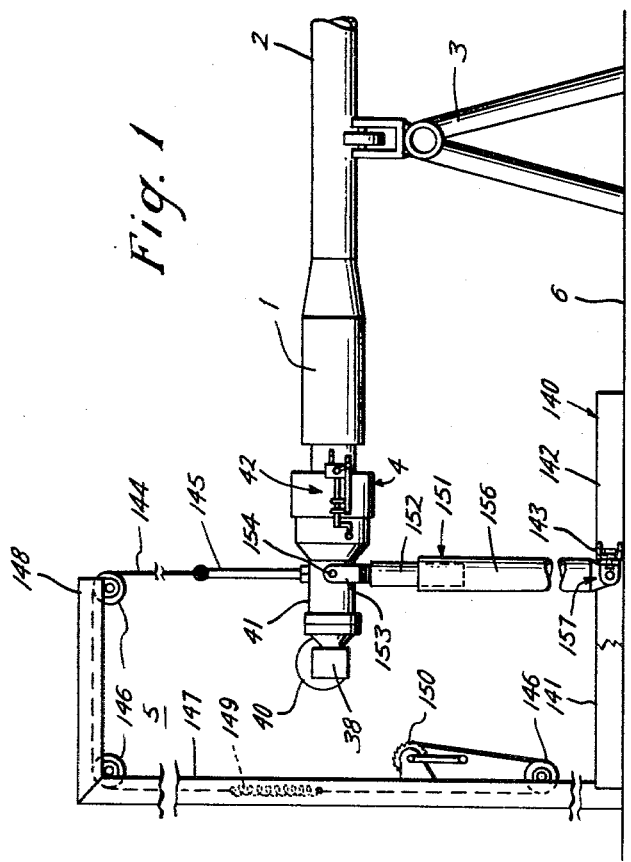
FIG. 1 is an elevation view in partial section of a refacing apparatus according to one embodiment of the present invention, showing the suspension apparatus, refacing device, tool joint, and pipe rack stand.

With particular reference to FIG. 1 of the drawings as an introduction to the present invention, a typical set-up at the rig site is illustrated, comprising a tool joint 1 connected to a drill pipe 2, of which only a portion is shown, one of the several pipe rack stands 3, a tool joint refacing device 4, and a suspension apparatus 5 resting on ground 6. Other types of pipe joints may be refaced according to the present invention and, as mentioned previously, the described example of a tool joint is chosen merely to illustrate the arrangement and operation of one type of apparatus in accordance with the present invention.

While the tool joint is a familiar piece of apparatus in the oil patch, it may be helpful to briefly review its important features. The individual lengths of drill pipe are fastened together by means of the tool joints, the male half of the tool joint, generally referred to as the pin tool joint, is fastened to one end of an individual piece of pipe and the female half, generally referred to as the box tool joint is fastened to the other end. The tool joints are necessary, because ordinary pipe proved to be unsuitable for drill pipe and a higher grade of steel must be used at the joints to prevent thread failure and resultant leakage. FIG. 2 illustrates a typical coupling of new tool joints, the pin tool joint 10 being coupled to the box tool joint 11. The box tool joint 11 has a conically shaped opening 13 with side walls that converge away from the exterior open end 22. The side walls of box tool joint opening 13 are threaded with a screw thread 23, helically extending about the axis of pin tool joint 10 and box tool joint 11. The pin tool joint 10 includes an extension 15, conical in shape and having a smaller diameter at its extreme outer and 16 and symmetrical about the tool joint axis 17. The tool joints 10 and 11 each has a central passage 18 and 19, respectively, to carry the mud used in the drilling operation. Pin tool joint extension 15 has a screw thread 20 on its outer surface that mates with the screw thread 23 on box joint 11. The screw threads 20 and 23 are generally referred to as taper threads in the pipe industry, as they are disposed on tapered surfaces that match when brought together to form a fluid tight tool joint.

When the pin tool joint 10 and box tool joint 11 are screwed together, a fluid tight seal occurs between face 26 at the box joint end 22 and face 25 on the pin tool joint 10. The pin tool joint extension 15 is slightly recessed within the box tool joint 11 to form the face 25. Each of tool joint faces 25 and 26 lie in planes that are transverse to the tool joint axis 17. As shown in FIG. 2–A, which is a blow up of the interface between the tool points 10 and 11, when new or properly reconditioned tool joints are in engagement, there is no gap or spacing between faces 25 and 26 and the screw threads 20 and 23 are in tight engagement. A fluid type seal is produced by the binding together of the metal of tool joint faces 25 and 26.

The tight engagement of screw threads 20 and 23 need not be a complete, metal-to-metal contact from crest to valley of the screw thread to form, in effect, a solid piece of iron. The screw threads 20 and 23 are in full thread contact, producing a rigid mechanical thread joint, even when there is sufficient clearance for grease between the screw threads. Tool joints are originally machined with a tolerance, so that $15/1000$ of an inch of the tool joint face can be removed to bring the tool joint screw threads into complete metal-to-metal contact. Even with this clearance a tight tool joint engagement is obtained, forming a rigid mechanical thread joint.

With this background on tool joints, the importance of and arrangement of one embodiment of the present invention can be easily illustrated and described. It should be first noted that the screw thread 23 on new box tool joint 11 extends further than necessary to completely engage the pin tool joint extension 15. Box tool joint 11 includes an addition length 30 of screw thread 23 that permits further tightening of the pin tool joint 10 and box tool joint 11 after the screw threads 20 and 23 have become worn and are in loose engagement at the extent of coupling illustrated in FIG. 2. Before the additional length of screw thread 30 can be used, however, it is necessary to reface the tool joint, i.e., remove the necessary amount of the tool joint face so that the tool joint faces 25 and 26 come together in binding engagement when the screw threads 20 and 23 are tight. If too little of the tool joint face is removed, the screw threads 20 and 23 will not tighten up and the tool joint coupling will not be rigid and leakage will occur. Also, the tool joint coupling can be sufficiently loose to cause a thread to shear, separating the tool joints, during a drilling operation.

The present invention makes use of pin and box adapters having the specifications of new tool joints and manufactured from exceptionally hard and durable metal to align apparatus that gauges and refaces a tool joint precisely to the specifications of a new tool joint. A reference means is provided on the adapter to gauge the amount of tool joint face that can be removed. FIG. 3 illustrates one embodiment of an adapter identified by reference numeral 35 and FIG. 4 illustrates an adapter for a box tool joint identified by reference numeral 36.

The refacing device 4, in addition to having an adapter, includes a mandrel 37 coupled to a gear reduction box 38 through a detachable coupling 39, and thence to a motor 40. The mandrel 37 is disposed in a housing 41 that supports a cutting device 42 and a gauge 43.

The housing 41 has a rear cylindrical chamber 46 with an axis coinciding with the rotational axis 24 of mandrel 37 and defined on one side by an inwardly projecting circumferential shoulder 47 and closed off on the opposite side by an end cap 48 secured to housing 41 by suitable fasteners 49 and to the housing 112 of gear reduction box 38 by suitable fastening means (not shown). On the opposite side of projection 47 from chamber 46 is a cylindrical chamber 55 of slightly larger diameter, coaxial with mandrel axis 24, that receives roller bearing 50. Roller bearing 50 has an inner race 51 fixed against a shoulder 52 of mandrel 37 by means of a retaainer nut 53 threaded on the rear end 45 of mandrel 37 to force a coupling sleeve 54 that slides freely on mandrel 37 into engagement with the inner bearing race 51. Roller bearing 50 has an outer race 28 tightly fitted to the wall of chaamber 55.

Adjacent housing chamber 55 is a further enlarged cylindrical chamber 56 coaxially disposed with respect to the mandrel axis 24 and having a shoulder 58 transverse to the axis of chamber 56 to receive a roller bearing 57. Roller bearing 57 supports the mandrel 37 for rotational movement. At the opposite end of housing 41 from the chamber 46 is a cylindrical chamber 59 having its axis coincident with the mandrel axis 24. Housing 41 has an opening 60 into chamber 59, transverse to mandrel axis 24, to permit assembling the mandrel 37 and bearings and attachment of the adapter 35, as will be described further on.

The mandrel 37 can be of a single piece construction, preferably cast and then machined down to the required dimensions. The mandrel 37 rotates freely within the housing 41, supported by bearings 50 and 57. The mandrel end 45, disposed in chamber 46, is coupled by means of separable coupling 39 to shaft 65 of gear reduction box 38. The opposite end of mandrel 37 has an enlarged circular plate 66 extending transverse to the mandrel axis 24 with threaded holes 63 for receiving fasteners 61 to attach adapter 35 (several other fasteners circumferentially disposed about plate 66 are not illustrated in the view of FIGS. 3 and 4). The central portion of plate 66 has a recess 67 with side walls that are beveled to receive and tightly follow a projection ring 68 of adapter 35.

The cutting device 42 is supported by housing 41 and arranged to dispose a cutting blade 70 for transverse and parallel movement with respect to the mandrel axis 24 to rework the face 25 of pin tool joint 10. Several types of feed mechanisms may be used to control the position of the cutting blade 70, as is well-known in the art of turning tools.

Specifically, the cutting device 42 includes a mounting plate 71 secured to housing 41 adjacent housing chamber 60, by a suitable means, such as welding. Cutting blade 70 is mounted for movement parallel to mandrel axis 24 by a carriage 72 having a base plate 73 with parallel grooves (not shown) that ride on rails 74 and 75 fastened to mounting plate 71. Base plate 73 has an aperture that receives a fastener 76, passing through an enlarged opening 77 in mounting plate 71 to lock carriage 72 in place at a desired cutting position. Base plate 73 has a threaded aperture 78 that receives a threaded rod 80 supported in uprights 81 and 82 for rotational movement. The uprights 81 and 82 are spaced apart and fastened to housing 41 and mounting plate 71 by suitable means, such as welding. Rod 80 has an enlarged neck 83, preventing the rod 80 from moving axially, towards carriage 72, and a hand crank 84 can be attached to rod 80 to position carriage 72.

Cutting blade 70 is mounted for movement at right angle to the mandrel axis 24 by a feed mechanism 85, best shown in FIG. 4, having a housing block 86 with a passage 87 carrying a tubular support 88 for cutting blade 70. The tubular support 88 is internally threaded to receive a feed screw 89 disposed in passage 87. Feed screw 89 has an enlarged neck 90 to prevent axial movement and a hand crank 91 attached at the end opposite tubular support 88. The operation of hand crank 91 rotates the feed screw 89 and moves the support 87 in housing block 86, thereby controlling the position of cutting blade 70 which is attached at the outer end of support 88 at right angle to the mandrel axis 24. The cutting blade 70 is shown at the angle of approximately 22 degrees to a line perpendicular to the axis of feed screw 89, but other cutting blade angles may be used, as well as the substitution of different types of cutting blades.

The gauge 43, illustrated in specific detail in FIG. 5, is supported by housing 41 through a mounting arm 90 that is held in a support block 92 attached to housing 41. The gauge 43 may be pivoted about support block 92 and moved parallel to the mandrel axis 24 by loosening the wing nut 93 that clamps the mounting arm 90 in the support block 92.

The gauge 43 is composed of a frame 95 having a flat face 96 with an index scale 97 at one end, calibrated in units of length. At the opposite end of frame face 96 from the scale 97 a pointer 98 is pivotally attached by a pin 62. Pointer 98 is of substantial length and extends to move along the scale 97 as the pointer 98 is pivoted. The position of pointer 98 is determined by the engagement of a ball contact member 99 loosely held in a socket 100 for rotational movement without dropping out. The pointer 98 is biased by means of a spring 101, retained in place by a guide rod 102 attached to the pointer 98 on the opposite side from contact member 99. The spring 101 acts against the contact member 103 held in a tubular retainer 104. Retainer 104 is opened at both ends and is attached to the frame 95. The contact member 103 is biased against an inwardly inclined lip 105 by spring 101 to prevent the contact member 103 from falling out.

It can be seen that the gauge 43 is arranged to have the contact members 99 and 103 inserted in a space between the faces of two members to gauge the distance, pointer 98 pivoting to indicate on scale 97 the gap dimension. The gauge 43 is also useful to measure the spacing when one or both of the member faces is moving, since the contact members 99 and 103 are free to rotate without changing the position of pointer 98. The contact members 99 and 103 significantly reduce frictional effect and, with hard balls similar to ball bearings, a substantial gauge life is realized. The scale 97 can be calibrated in thousandths of an inch, the illustrated scale having a maximum scale deflection of 90 thousandths of an inch to the right (as viewed in FIG. 5), from the upright zero position of pointer 98, and a marking of "reject" to the left of the zero position.

The motor 40 is coupled through the gear reduction box 38 and coupling 39 to the mandrel end 45 to rotatably drive the mandrel 37. A number of types of motors may be used, such as an electric or an air driven motor. The motor 40 has a casing 110 that is mechanically coupled by a housing bracket 111 to the housing 112 of the gear reduction box 38. The gear reduction box 38 may take many forms, the purpose being to reduce rotational speed and to increase torque capacity. The gear reduction box 38 may be eliminated where a motor of suitable rotational speed and torque capacity is available for direct coupling to the mandrel 37.

Precise alignment of the tool joint refacing device 4 in a tool joint is provided by the use of adapters that are removably attached to the mandrel plate 66, adapter 35 being for the pin type tool joint (FIG. 3) and adapter 36 being for the box type tool joint (FIG. 4). The adapter 35 has annular ring 115 with a conically shaped aperture 116 arranged, when fastened to the mandrel plate 66, to extend coaxially with the mandrel axis 24. The walls of conical aperture 116 converge from the largest diameter at the housing opening 60 to the smallest diameter at the projection ring 68 that mateably fits in engagement with the wall of mandrel plate aperture 67. The adapter 35 has a flat outer face 121 at right angles to mandrel axis 24. Fastener holes 117 are provided in adapter 35, enlarged to receive the head of fasteners 61 in such a manner that the adapter 35 can be removed without having to remove the fasteners 61. Such an arrangement is conventional in the machinery art, accomplished by having a portion of the aperture 117 enlarged to pass the entire fastener, including its head, and an adjacent portion of the hole which is narrowed down to receive only the smaller diameter threaded portion of the fastener and permitting the fastener head to clamp against the shoulder formed by narrowing aperture. The adapter 35 is removed by loosening the fasteners 61 and rotating and pulling the adapter 35 away from mandrel 37.

The wall of adapter aperture 116 receives a screw thread 118 extending helically about the axis of mandrel 37. The screw thread 118 is designed in conjunction with the taper of the conical aperture 116 to the specification of a new box type tool joint. The adapter 35 is made from a hardened metal that resists wear and is durable so that the adapter 35 is in essence a standard adapter with which the used pin tool joints can be compared. One notable difference between the adapter 35 and a typical box type tool joint is that the screw thread 118 does not extend as far in the adapter 35. In other words, when a pin type tool joint is tightly screwed into the adapter 35, a substantial length of the screw thread 20 adjacent the tool joint face 25 will not be engaged, leaving a gap 120 between the tool joint face 25 and the adapter outer face 121. For every used tool joint that meets the specification of a new tool joint the distance of gap 120 will be the same. But, for a used tool joint that has worn threads, the tool joint will screw farther into the standard adapter 35 and the distance of gap 120 will decrease. By using a reference means, adapter outer face 121, the dimension of gap 120 is a direct check on how much tool joint face to remove to permit the tool joint faces to come together with tool joint screw threads in tight engagement.

A suitable instrument can be used with the reference means, adapter outer face 121, to compare with the gap 120 standard specifications as each used tool joint is screwed tightly onto adapter 35. For example, gauge 43 can be disposed in gap 120 to place contact member 103 in engagement with adapter outer face 121 and contact member 99 in engagement with tool joint face 25. The gauge pointer 98 will then indicate the gap dimension. As shown in FIG. 5, the scale 97 indicates zero when the gap spacing is identical to spacing for a new or properly machined pin tool joint. If pointer 98 moves to the right, as viewed in FIG. 5, the dimension for gap 120 is small and the pointer 98 indicates the amount of tool joint face that can be removed. If the pointer 98 moves to the left, dimension of the gap 120 is larger than for a new tool joint, and the tool joint face 25 cannot be reworked without having to rethread the tool joint and on-the-site refacing cannot be accomplished.

In this latter case, the scale 97 appropriately indicates that the tool joint is a "reject."

For a box tool joint the adapter 36 is used (FIG. 4). Adapter 36 is attached to mandrel 37 by means of fasteners 61 disposed in apertures 125 identically arranged as the apertures 117 in adapter 35 for removal of adapter 36 from mandrel 37. Adapter 36 has a circular shoulder 64 with an outer flat face 126 lying in a plane at right angle to the mandrel axis 24. Projecting away from the adapter outer face 126 is an extension 127 having a portion 8 of uniform circular cross section and then having an end 9 that tapers inwardly in a conical fashion about the mandrel axis 24. The surface of adapter end 9 has a screw thread 128 extending helically about the axis of mandrel axis 24.

The taper of adapter end 9 and the screw thread 128 are arranged in accordance with the specification of a new pin tool joint. When a new box type tool joint is screwed into tight engagement with adapter 36, the tool joint face will come up on the adapter end 9 to a point where the taper begins, immediately adjacent the adapter portion 8. The adapter outer face 126 and tool joint face 26 form a gap 130 with a dimension, when the tool joint 11 is a new tool joint, that can be determined and appropriately marked for gauging the variation of other box tool joints. A tool joint that has a worn thread will produce a smaller dimension for gap 130 and tool joints on which no more tool joint face can be removed will have a large dimension for gap 130. Adapter 36 can be made from the same type of hardened, durable metal, as described for adapter 35. As with adapter 35, gauge 43 can be disposed between the adapter outer face 126 and tool joint face 26 to determine the dimension of gap 130 and indicate the amount of tool joint face to remove. The scale 97 can be used by selection of the same dimension for gaps 120 and 130 with properly machined tool joints.

In essence, it can be seen that each of the adapters 35 and 36 function as a standard, and by using a reference means on the adapter the variation of the used tool joint from the standard can be determined.

The operation of the refacing device 4 is generally apparent from the previous description. The inspection and refacing operation can be accomplished at the rig site where the pipe is disposed on a rack stand 3, referring to FIG. 1 which only shows one of several racks that may be used to support the pipe section 2. The refacing device, with either adapter 35 or 36, depending on the type of tool joint being inspected or reworked, is positioned opposite the tool joint. Motor 40 is started to engage the screw thread of the tool joint with the adapter screw thread in a rigid mechanical thread joint. Motor 40, through gear box 38, provides sufficient torque to rotate the tool joint and pipe section 1 on the rack stand 3. A suitable gauge is then inserted, for example gauge 43, to indicate the condition of the tool joint by measuring the distance between the tool joint face and reference means, the adapter outer face. If there is enough tool joint face left for removal, the motor 110 is energized to rotatably drive the tool joint and the pipe section attached thereto and the hand cranks 84 and 91 of cutting device 42 are adjusted to position the cutting blade 70 to rework the tool joint face to the specification of a new tool joint. When adapter 36 is used, adapter extension portion 8 is recessed sufficiently below the lower edge of tool joint face 26 to permit reworking of the entire tool joint face 26. The outer edge of the tool joint face can be beveled and the appropriate groove can be cut on the inner edge of the tool joint face with the refacing device 4.

When refacing of the tool joint is completed, the direction of rotation of motor 40 is reversed and the refacing device 4 is unscrewed from the tool joint. Gauge 43 can be disposed to indicate the amount of tool joint face that need be removed even during the refacing of the tool joint. The fastener aperture, either 117 for adapter 35 or 117 for adapter 36 can be plugged to present a uniform face for the gauge contact member 105, or the adapter shoulder 66 can be extended so that a substantial uninterrupted portion of outer face 126 is available for the contact member 103 to ride on.

The refacing device may be hand held to counter the rotational effect of the motor 40, or the refacing device can be suspended, with one of the advantages being the elimination of the need for the operator to stand with the refacing device during the refacing operation. A further advantage of suspension is that the refacing device 4 is arranged for movement in any direction, as the tool joint moves, without changing the important alignment of the tool joint and cutting blade 70 illustrated in FIG. 1.

The suspension apparatus 5, is one embodiment of apparatus that is suitable for achieving the aforementioned advantages. In particular, suspension apparatus 5 includes a base 140 having legs 141 and 142 that lie on ground 6 coming together at one end to form a V and a cross member 143 connected between the legs 141 and 142 to complete the general shape of an A frame. The refacing tool is suspended from a cable 144 attached to a connecting rod 145 that is in rigid engagement at a balance point with the refacing device. The cable 144 passes over several pulleys 146 spaced along an L-shaped frame 147 attached to and extending vertically from base legs 141 and 142. The frame 147 has an arm 148 extending substantially parallel to base 140 over the refacing tool. Connected in the cable line is a spring 149 of large capacity and the cable 144 is attached to a hoist mechanism 150 adjacent the base 140. The hoist mechanism 150 can be adjusted to tighten the cable 144, supporting the refacing device above the ground in a position opposite tool joint 1 and the hoist mechanism can be locked to retain this position. Spring 149, that is partially stretched, provides a resilient suspension for the refacing device 4, permitting up and down movement with the tool joint 1.

To counter the rotational effect of motor 40, an adjustable connection 151 is made between the refacing device and base 140. The adjustable connection 151 includes a leg 152 having a fork-shaped upper end 153 that embraces the housing 41 and is pivotally attached thereto by means of fasteners 154. Leg 152 slides freely at one end of a tubular mount 162. The other end of mount 162 is pivotally connected to a bifurcated receiver 157 which is in turn pivotally connected by pin 158 to cross member 143 for movement in a 360 degree azimuth with reference to point of attachment of the bifurcated receiver 157.

The refacing device 4 is free to move when the suspension apparatus 5 is used, irrespective of the direction of movement of the tool joint 1. Controlled up and down movement is permitted by spring 149 with connection 151 free moving in a vertical direction as leg 152 slides in mount 156. Movement of the refacing device 4 in the forward or rear direction, as viewed in FIG. 1, is allowable through cable 144 suspending the refacing device and universal joint 157 attaching mount 156 to the base 140. Movement in a direction to either side, inwardly and outwardly from the plane of the drawing of FIG. 1, is allowable due to the arrangement just mentioned in connection with the forward and back movement of the refacing device 4. The refacing device 4 can pivot about the axis of mount 156, since the leg 152 freely rotates in the mount 156, and pivots in leg upper end 153.

Thus, the suspension apparatus 5 permits the free movement of the refacing device 4, eliminating the possibility that the tool joint reface will not be true and meet the specifications for a new tool joint due to irregularly shaped tool joint or a deformed pipe section.

It is apparent that other arrangement of apparatus and modifications of the illustrated embodiment can be made without departing from the teaching of the present invention. Accordingly, the scope of patentable invention is to include these changes and modifications, as defined by the appended claims.

I claim:

1. A device for refacing a pipe joint having a screw thread for engagement with another pipe joint, comprising, means for engaging the screw thread of the pipe joint, said engaging means having a member with a taper screw thread arranged to mate with the screw of the pipe joint in a rigid mechanical thread joint;

a support means;

said member being mounted for rotational movement on said support means to engage with the pipe joint;

means arranged to rotate said member for the member screw thread to form a rigid mechanical thread joint with the pipe joint screw thread and to thereafter rotatably drive the pipe joint; and cutting means supported by said support means and movable for refacing the pipe joint as the pipe joint is rotated;

said engaging means having a reference means spaced from the pipe joint face for use in indicating the amount of pipe joint face that can be removed.

2. A device for refacing a pipe joint having a screw thread for engagement with another pipe joint, comprising, means for engaging a pipe joint having a screw thread, said engaging means having a member with a screw thread arranged to mate in locking engagement with the screw thread of the pipe joint, said engaging means having a face spaced from the pipe joint face when the member screw thread is in locking engagement with the pipe joint screw thread to define a space for gauging the amount of pipe joint face that can be removed;

a support means;

said member being mounted for rotational movement on said support means to engage with the pipe joint;

means arranged to rotate said member into locking engagement of the member screw thread with the pipe joint screw thread to rotatably drive the pipe joint; and, cutting means carried by said support means and movable for refacing the pipe joint as the pipe joint is rotated by said drive means.

3. The device, as described in claim 2, further comprising, a gauge means carried by said support means and operable to be disposed in the space between said engaging means face and the tool joint face to indicate the spacing.

4. The device, as described in claim 3, wherein, said gauge means comprises a frame,
a calibrated scale on said frame,
a pointer mounted on said frame,
two resilient contact means spaced apart and arranged to activate said pointer in proportion to the spacing between said contact means, one of said contact means abutting the engaging means face and the other of said contact means abutting the tool joint face.

5. A portable power tool for refacing pipe joints that may have a crooked and deformed pipe section, comprising, an adapter having thread means for coupling to a pipe joint by a rigid mechanical thread joint;

said adapter having reference means spaced from said pipe joint face when said adapter rigidly engages the pipe joint to form a gap for gauging and cutting of the pipe joint face;

a support frame;

means mounting said adapter for rotational movement on said support frame;

cutting tool means carried by said support frame and movable to engage said pipe joint face;

a drive motor means carried by said support frame and coupled to rotate said adapter into rigid engagement with the pipe joint and thereafter rotably drive the pipe joint, including the pipe section;

a suspension means for said support frame to prevent rotational movement of said support frame due to the reaction of the motor means while permitting movement of the support frame in other directions.

6. The device, as described in claim 5, wherein, said suspension means includes a stand having a base that rests on the ground, said stand having an arm supported above said base, a cable extending from said arm and attached at one end to said support frame and at the other end to said stand, resilient means in series with said cable to provide for up and down movement of said support frame in the vertical direction from the ground, and leg means connected between said base and said support frame to permit side, forward and back movement of said support frame and allow the support frame to move up and down, as the pipe joint moves.

References Cited by the Examiner
UNITED STATES PATENTS

| | | | |
|---|---|---|---|
| 1,154,620 | 9/15 | Eitner. | |
| 1,397,541 | 11/21 | Owens. | |
| 1,437,552 | 12/22 | Reading | 82—4 X |
| 1,539,356 | 5/25 | Horstmann. | |
| 2,092,637 | 9/37 | Brown | 82—4 |
| 2,159,287 | 5/39 | Morgan | 82—4 X |
| 2,831,387 | 4/58 | Ovshinsky | 82—24 X |
| 2,900,858 | 8/59 | Gauthier et al. | |
| 3,124,024 | 3/64 | Pittman. | |

WILLIAM W. DYER, Jr., *Primary Examiner.*